(12) United States Patent
Pai et al.

(10) Patent No.: US 11,009,974 B2
(45) Date of Patent: May 18, 2021

(54) TOUCH PAD STRUCTURE

(71) Applicant: Acer Incorporated, New Taipei (TW)

(72) Inventors: Ting-Wen Pai, New Taipei (TW);
Chih-Chun Liu, New Taipei (TW);
Yu-Shih Wang, New Taipei (TW);
Chien-Yuan Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/788,281

(22) Filed: Feb. 11, 2020

(65) Prior Publication Data

US 2021/0011565 A1    Jan. 14, 2021

(30) Foreign Application Priority Data

Jul. 9, 2019   (TW) .................................. 108124115

(51) Int. Cl.
*G06F 3/0354*    (2013.01)
(52) U.S. Cl.
CPC .............................. *G06F 3/03547* (2013.01)
(58) Field of Classification Search
CPC .................................................. G06F 3/03547
USPC ............................................... 345/156, 168
See application file for complete search history.

(56) References Cited

U.S. PATENT DOCUMENTS

2012/0262393 A1\* 10/2012 Yokoyama ............... G05G 1/02
345/173

FOREIGN PATENT DOCUMENTS

| TW | I479299 | 4/2015 |
| TW | I531890 | 5/2016 |
| TW | I630512 | 7/2018 |
| TW | M579755 | 6/2019 |

\* cited by examiner

*Primary Examiner* — Deeprose Subedi
(74) *Attorney, Agent, or Firm* — JCIPRNET

(57) ABSTRACT

A touch pad structure includes a first casing, a second casing, a touch pad, an elastic element, a button, and an adjusting element. The first casing has an opening and is disposed on the second casing. The touch pad is disposed in the opening. The touch pad has a pivot portion and a movable portion. The pivot portion is pivoted to the first casing. A side of the movable portion facing the second casing is provided with a trigger. The elastic element is located between the first casing and the second casing. The elastic element has a first end and a second end. The button is aligned to the trigger and abuts against the first end of the elastic element. The adjusting element rotatably and movably penetrates through the second casing and is aligned to the button. The adjusting element abuts against the second end of the elastic element.

11 Claims, 7 Drawing Sheets

TOUCH PAD STRUCTURE

CROSS-REFERENCE TO RELATED APPLICATION

This application claims the priority benefit of Taiwan patent application serial no. 108124115, filed on Jul. 9, 2019. The entirety of the above-mentioned patent application is hereby incorporated by reference herein and made a part of this specification.

BACKGROUND OF THE DISCLOSURE

Field of the Disclosure

The present disclosure relates to a touch pad structure, and particularly relates to a touch pad structure applied to an electronic device.

Description of Related Art

A host of a common electronic device (such as a notebook computer) is provided with a keyboard and a touch pad serving as a physical operation interface for a user. On the other hand, the keyboard and the touch pad are common in a docking station, wherein a tablet computer or a smart phone can be mounted on the docking station, and the user can operate the tablet computer or the smart phone through the keyboard and the touch pad.

In general, the pressing hand feeling or counterforce of the touch pad is constant, but different users have different operation habits, and the pressing hand feeling or counterforce of the touch pad preset in a factory is not suitable for all users. Therefore, how to enable the user to adjust the pressing hand feeling or counterforce of the touch pad according to individual operation habits has become one of the researching projects actively invested by relevant manufacturers.

SUMMARY OF THE DISCLOSURE

The present disclosure is directed to a touch pad structure, which can provide different pressing hand feelings for users.

A touch pad structure according to an embodiment of the present disclosure includes a first casing, a second casing, a touch pad, an elastic element, a button, and an adjusting element. The first casing has an opening and is disposed on the second casing. The touch pad is disposed in the opening. The touch pad has a pivot portion and a movable portion opposite to each other. The pivot portion is pivoted to the first casing. A side of the movable portion facing the second casing is provided with a trigger. The elastic element is located between the first casing and the second casing. The elastic element has a first end and a second end opposite to each other. The button is aligned to the trigger and abuts against the first end of the elastic element. The adjusting element rotatably and movably penetrates through the second casing and is aligned to the button. The adjusting element abuts against the second end of the elastic element.

A touch pad structure according to another embodiment of the present disclosure includes a first casing, a second casing, a touch pad, an elastic button, and an adjusting element. The first casing has an opening and a carrying portion located in the opening. The first casing is disposed on the second casing. The touch pad is disposed in the opening. The touch pad has a pivot portion and a movable portion opposite to each other. The pivot portion is pivoted to the first casing. A side of the movable portion facing the second casing is provided with a trigger. The elastic button is disposed at the carrying portion and is aligned to the trigger. The adjusting element rotatably and movably penetrates through the second casing. The adjusting element is aligned to the elastic button and abuts against the elastic button.

Based on the above, in the touch pad structure of the present disclosure, a user can adjust the pre-compression amount of the elastic element or the elastic button according to individual operation habits so as to obtain a specific operation hand feeling when operating the touch pad structure.

In order to make the above features and advantages of the present disclosure more obvious and comprehensible, embodiments accompanied with drawings are described in detail below.

DESCRIPTION OF THE EMBODIMENTS

Figure 1:
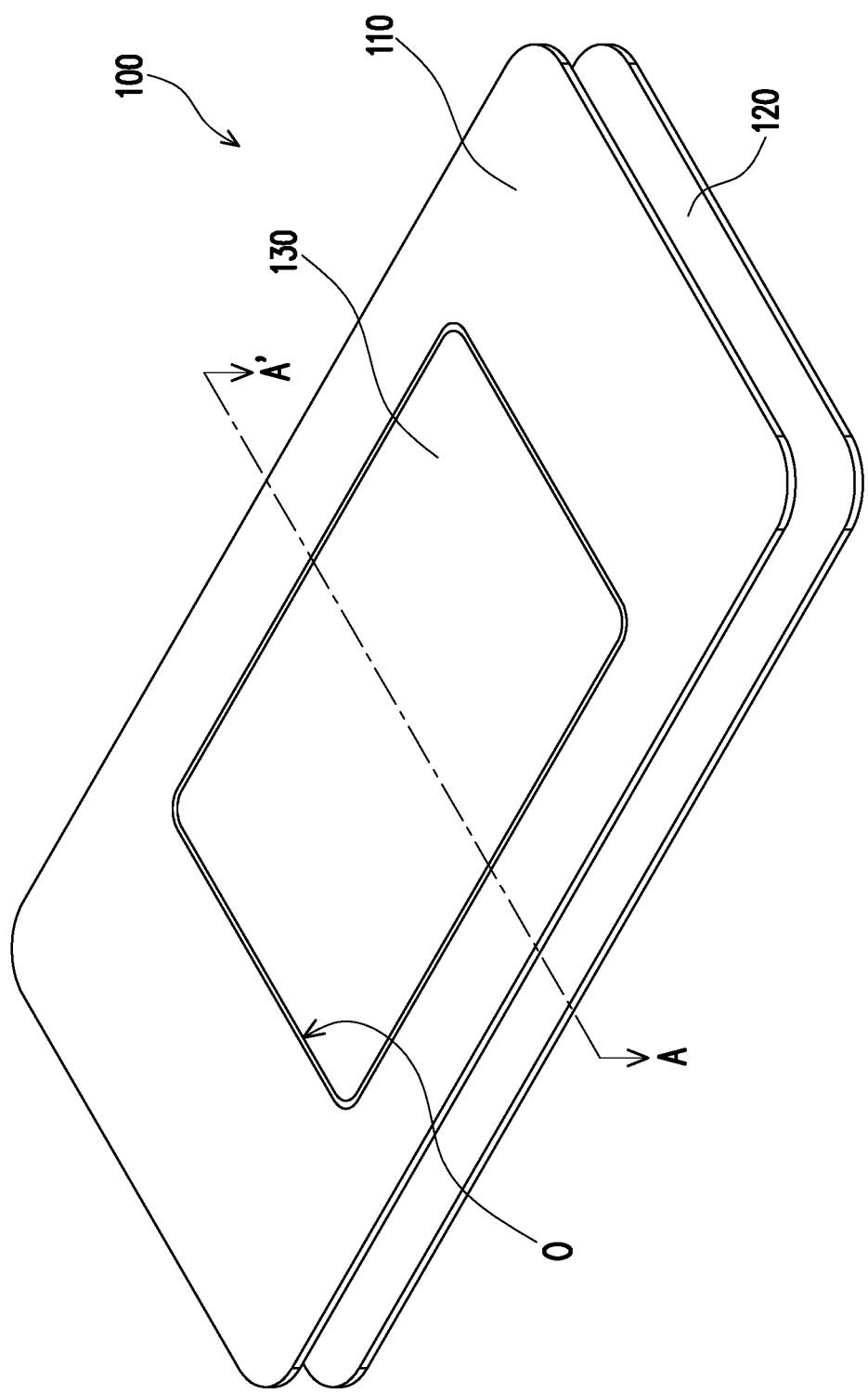
FIG. 1 is a schematic view of a touch pad structure according to an embodiment of the present disclosure.
Figure 2A:
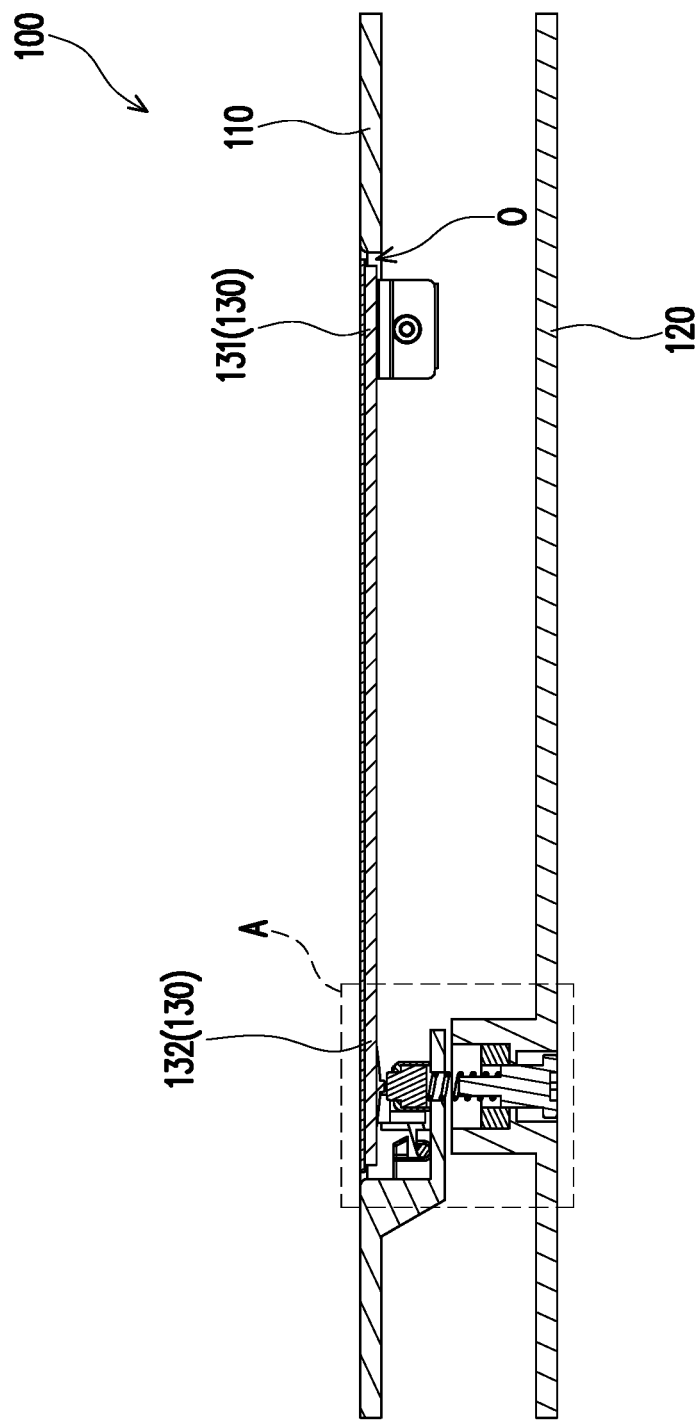
FIG. 2A is a cross-sectional schematic view of the touch pad structure of FIG. 1 along a line segment A-A'.
Figure 2B:
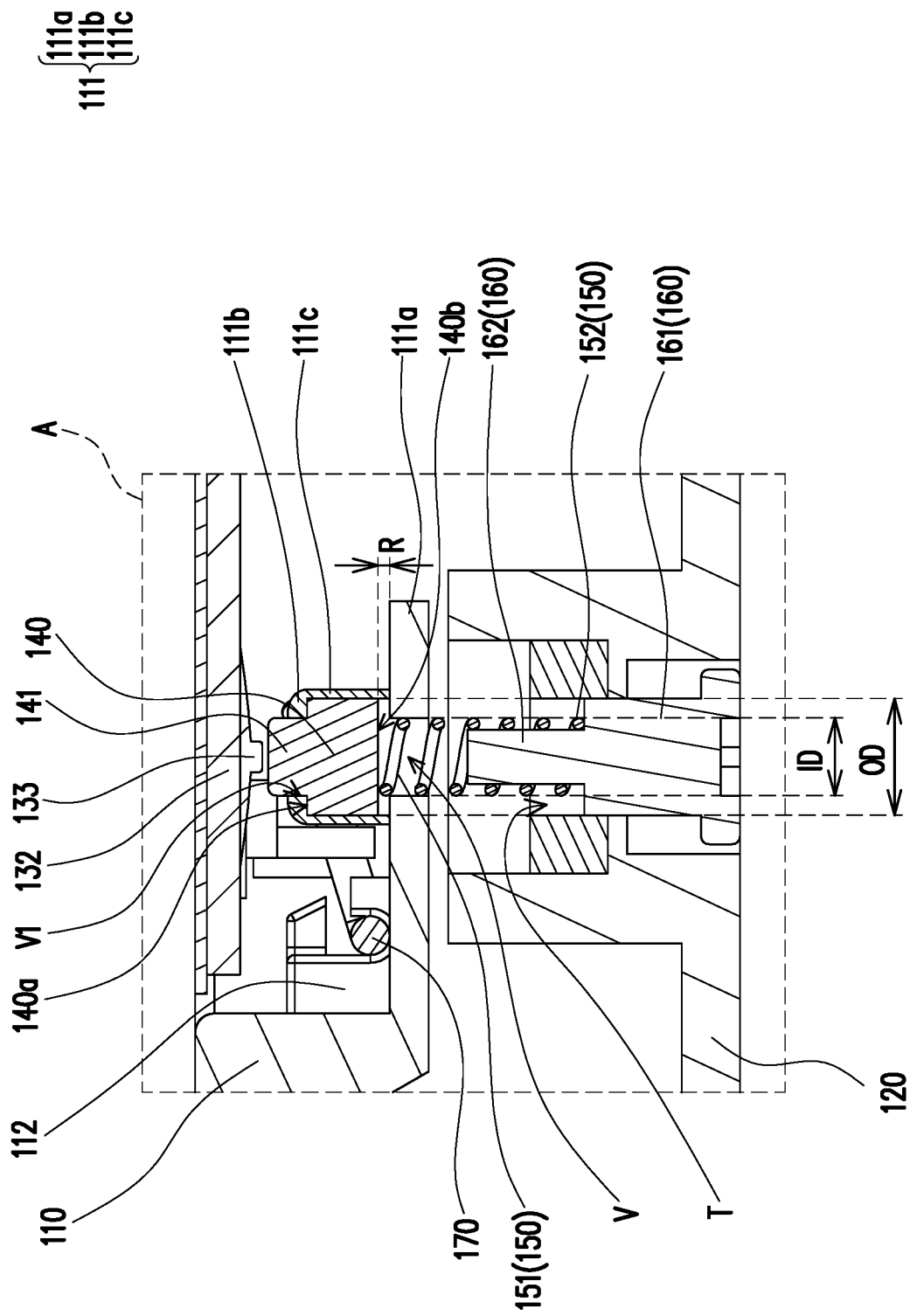
FIG. 2B is a partially enlarged schematic view of a region A of FIG. 2A.

FIG. 1 is a schematic view of a touch pad structure according to an embodiment of the present disclosure. FIG. 2A is a cross-sectional schematic view of the touch pad structure of FIG. 1 along a line segment A-A'. FIG. 2B is a partially enlarged schematic view of a region A of FIG. 2A. Referring to FIG. 1, FIG. 2A and FIG. 2B, in the present embodiment, a touch pad structure 100 can be applied to a notebook computer or a docking station and is integrated into a casing of a host of the notebook computer or a casing of the docking station. The touch pad structure 100 includes a first casing 110 and a second casing 120, wherein the first casing 110 and the second casing 120 can be a part of the casing of the host of the notebook computer or a part of the casing of the docking station, and FIG. 1, FIG. 2A and FIG. 2B illustrate a state that the touch pad structure 100 is not pressed by force, i.e., the touch pad structure 100 is in an initial state.

Specifically, the first casing 110 is disposed on the second casing 120, and the touch pad structure 100 further includes a touch pad 130, a button 140, an elastic element 150, and an adjusting element 160. The first casing 110 has an opening O, and the touch pad 130 is disposed in the opening O. The touch pad 130 has a pivot portion 131 and a movable portion 132 opposite to each other, wherein the pivot portion 131 is pivoted to the first casing 110, so that the movable portion 132 can be rotated relative to the first casing 110 based on the pivot portion 131 which is served as a rotating fulcrum. In response to different operation states, when the user applies force to and presses the movable portion 132, the movable portion 132 can be rotated and moved close to the second casing 120 based on the pivot portion 131 which is served as a rotating fulcrum. Otherwise, if the force applied to the movable portion 132 is removed, the movable portion 132 can be rotated and moved away from the second casing 120 based on the pivot portion 131 which is served as a rotating fulcrum, and thus returning to an initial position (as shown in FIG. 2A).

In the present embodiment, a trigger 133 is disposed at a side of the movable portion 132 of the touch pad 130 facing the second casing 120, wherein the trigger 133 can adopt a metal dome switch, a rubber dome switch and other types of contact switches or non-contact switches, and the trigger 133 is substantially located at the tail end of the movable portion 132. On the other hand, the button 140, the elastic element 150 and the adjusting element 160 are located in the range of the orthographic projection of the opening O, wherein the elastic element 150 is located between the first casing 110 and the second casing 120, and the button 140 is located between the movable portion 132 (or the trigger 133) and the elastic element 150.

In order to ensure that the movable portion 132 being rotated and moved close to the second casing 120 to contact the button 140 through the trigger 133 and thus triggering the trigger 133, the trigger 133 is aligned to the button 140. For example, before the movable portion 132 is pressed by force, a gap is maintained between the trigger 133 and the button 140, or the trigger 133 is in slight contact with the button 140 but is not triggered. FIG. 2B illustrates an exemplary embodiment in which a gap is maintained between the trigger 133 and the button 140, but the present disclosure is not limited thereto. After the force applied to the movable portion 132 is removed, the touch pad 130 can return to the initial state through a corresponding restoring element (such as a torsion spring or other forms of springs).

Further, the elastic element 150 can adopt a compression spring, and the elastic element 150 has a first end 151 and a second end 152 opposite to each other, wherein the first end 151 of the elastic element 150 abuts against the button 140, and the second end 152 of the elastic element 150 abuts against the adjusting element 160 penetrating through the second casing 120. Further, the adjusting element 160 can adopt an adjusting screw, and the second casing 120 can be provided with a lock hole T for the adjusting element 160 to be locked. Based on the cooperation of the external threads of the adjusting element 160 with the internal threads of the lock hole T, the user can rotate the adjusting element 160 to adjust the depth of the adjusting element 160 locked (or moved) into the second casing 120. As the change of the depth of the adjusting element 160 locked (or moved) into the second casing 120, the elastic element 150 being compressed can generate different degrees of deformation, thereby setting the pre-compression amount of the elastic element 150. On the other hand, in order to ensure that the adjusting element 160 locked (or moved) into the second casing 120 can move towards the button 140 to compress the elastic element 150, the adjusting element 160 is aligned to the button 140.

For example, if the pre-compression amount of the elastic element 150 is greater, the elastic potential energy accumulated by the elastic element 150 is greater, and accordingly, the counterforce of the elastic element 150 acting on the button 140 is also greater. Therefore, when the user presses the movable portion 132 to enable the trigger 133 to be in contact with the button 140, the user feels a relatively solid pressing hand feeling. On the contrary, if the pre-compression amount of the elastic element 150 is smaller, the elastic potential energy accumulated by the elastic element 150 is smaller, and accordingly, the counterforce of the elastic element 150 acting on the button 140 is also smaller. Therefore, when the user presses the movable portion 132 to enable the trigger 133 to be in contact with the button 140, the user feels a relatively soft pressing hand feeling. In other words, the user can adjust the pre-compression amount of the elastic element 150 according to individual operation habits so as to obtain a specific operation hand feeling when operating the touch pad structure 100.

Referring to FIG. 2B, in order to limit the moving direction and the moving stroke of the button 140, the first casing 110 includes a carrying portion 111 located in the opening O, and the carrying portion 111 is located on a straight connecting line of the adjusting element 160 and the button 140. Specifically, the carrying portion 111 includes a bottom plate 111a, a stop portion 111b, and a side wall 111c located between the bottom plate 111a and the stop portion 111b, wherein the bottom plate 111a is connected to the inner edge of the opening O, and the side wall 111c connects the bottom plate 111a and the stop portion 111b. In the present embodiment, the side wall 111c can be of an annular structure, and the button 140 can be of a columnar structure cooperative with the annular structure. On the other hand, the top surface 140a of the button 140 abuts against the stop portion 111b, and the bottom surface 140b opposite to the top surface 140a of the button 140 is pushed by the first end 151 of the elastic element 150 to keep a gap R from the bottom plate 111a. Therefore, the button 140 disposed in the carrying portion 111 has a degree of freedom of motion for sliding relative to the carrying portion 111. Under the condition that the side wall 111c surrounds the button 140 and the side wall surface of the button 140 is in contact with the inner wall surface of the side wall 111c, the button 140 is configured to slide along a direction perpendicular to the bottom plate 111a.

Further, the bottom plate 111a has a through hole V which is used for the first end 151 of the elastic element 150 to penetrate through and abuts against the bottom surface 140b of the 140, wherein the stop portion 111b opposite to the bottom plate 111a is provided with a through hole V1, and the through hole V is aligned to the through hole V1. The top surface 140a of the button 140 is provided with a protrusion 141 (or the protrusion 141 protrudes from the top surface 140a), wherein the protrusion 141 penetrates through the stop portion 111b via the through hole V1 and is aligned to the trigger 133, a gap is maintained between the protrusion 141 and the trigger 133, or the protrusion 141 is in slight contact with the trigger 133 but does not trigger the trigger 133. FIG. 2B illustrates an exemplary embodiment in which a gap is maintained between the protrusion 141 and the trigger 133, but the present disclosure is not limited thereto.

In the present embodiment, the inner diameter ID of the through hole V of the bottom plate 111a is smaller than the outer diameter OD of the button 140. In other words, the button 140 which is moved close to the bottom plate 111a cannot be separated from the carrying portion 111 via the through hole V. Once the bottom surface 140b of the button 140 is in contact with the bottom plate 111a, the button 140 stops moving. The button 140 is limited to slide back and forth between the bottom plate 111a and the stop portion 111b, thereby preventing the user from applying excessive force to the movable portion 132 of the touch pad 130 to damage the trigger 133 or the whole mechanism, and simultaneously, preventing the hand feeling of operating the touch pad 130 from being too soft.

In addition, a portion, of the adjusting element 160, having external threads is a locking portion 161, and a pillar portion 162 extends from the locking portion 161. The locking portion 161 is configured to be screwed and locked to the lock hole T of the second casing 120. The locking portion 161 has a head portion exposed to the second casing 120, which is convenient for the user to rotate the adjusting element 160 handily by a corresponding tool (such as a screw driver). On the other hand, the second end 152 of the elastic element 150 is sleeved on the pillar portion 162 and abuts against the locking portion 161, so that the pillar portion 162 can be used for limiting the deformation or restoring direction of the elastic element 150, and thus preventing the elastic element 150 from being twisted or deviated.

Figure 3:
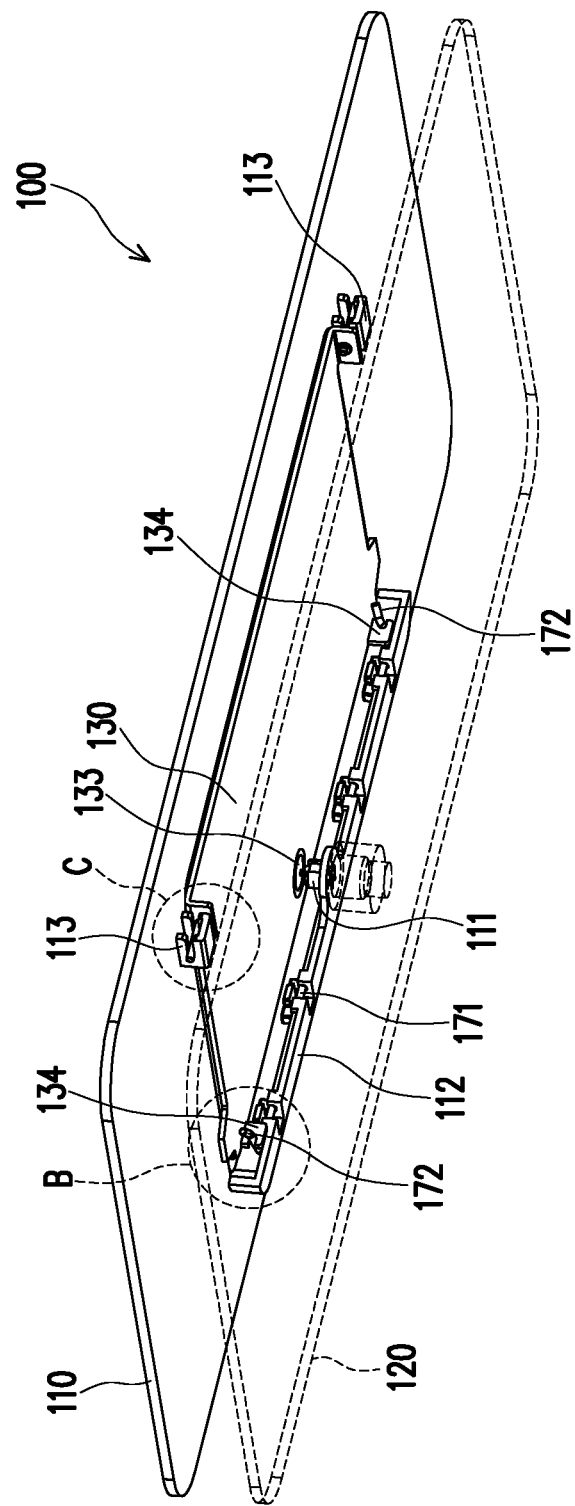
FIG. 3 is a schematic view of the touch pad structure of FIG. 1 from another perspective.
Figure 4:
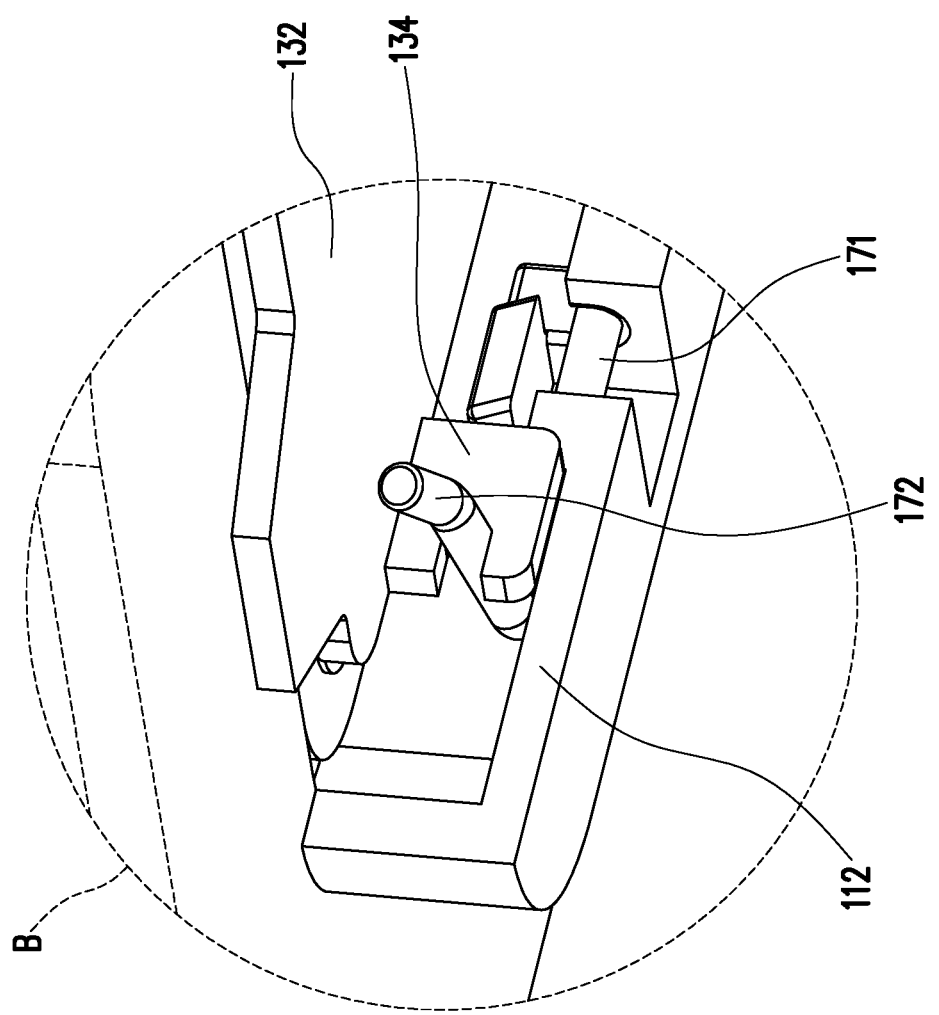
FIG. 4 is a partially enlarged schematic view of a region B of FIG. 3.
Figure 5:
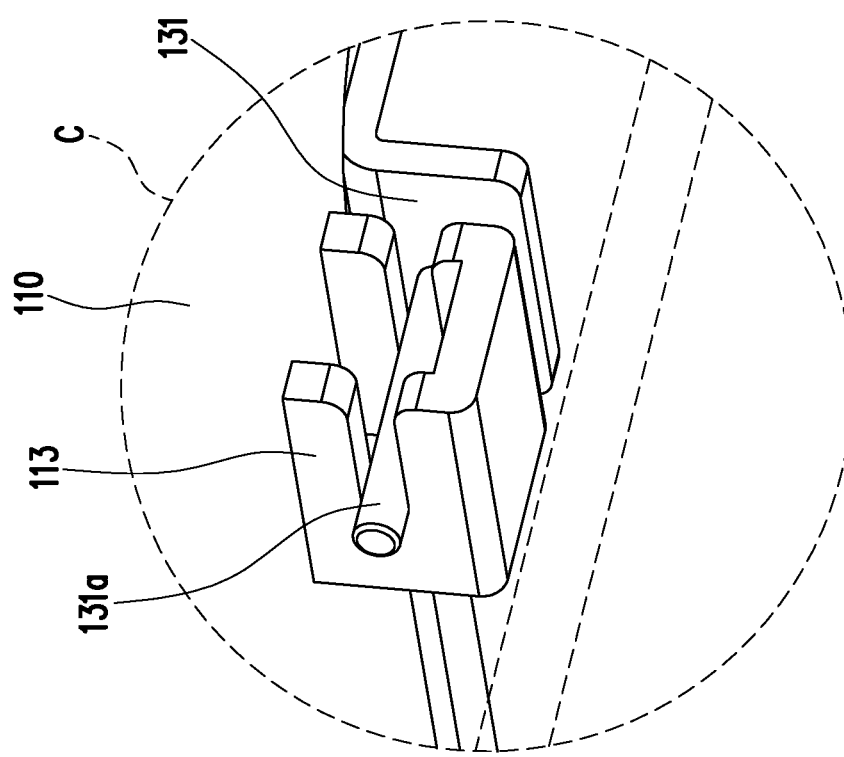
FIG. 5 is a partially enlarged schematic view of a region C of FIG. 3.

FIG. 3 is a schematic view of the touch pad structure of FIG. 1 from another perspective. FIG. 4 is a partially enlarged schematic view of a region B of FIG. 3. FIG. 5 is a partially enlarged schematic view of a region C of FIG. 3. For ease of explanation and clear representation, FIG. 3 omits the elastic element 150 and the adjusting element 160, and the second casing 120 is shown by dotted lines. Referring to FIG. 2B, FIG. 3 and FIG. 4, in the present embodiment, the first casing 110 further includes a bracket 112 located in the opening O, and the carrying portion 111 and the bracket 112 may be an integrally formed structure. On the other hand, the touch pad structure 100 further includes a linkage element 170, wherein the bracket 112 and the linkage element 170 are located between the touch pad 130 and the second casing 120, and the bracket 112 can be integrally formed on the first casing 110. In detail, the linkage element 170 includes a rod portion 171 and two abutting portions 172 connected to the rod portion 171, wherein the rod portion 171 of the linkage element 170 is pivoted to the bracket 112, so that the linkage element 170 can be rotated relative to the bracket 112. The two abutting portions 172 are symmetrically disposed at two opposite sides of the trigger 133 and are used for carrying the movable portion 132 of the touch pad 130. Based on the arrangement of the linkage element 170, the rotational stability of the movable portion 132 of the touch pad 130 can be improved.

Further, two hooks 134 are disposed at a side of the movable portion 132 of the touch pad 130 facing the second casing 120, and the two abutting portions 172 movably penetrate through the two hooks 134 respectively. For example, when a point of application of force of the user on the movable portion 132 of the touch pad 130 deflects to one side (for example close to one of the two hooks 134), the sinking of one of the two hooks 134 drives the corresponding abutting portion 172 to enable the whole linkage element 170 to sink, and simultaneously, the other abutting portion 172 also drives the other one of the two hooks 134, so that the movable portion 132 of the touch pad 130 stably rotates and is not easy to shake or deviate. In other words, regardless of the position at which the user presses the movable portion 132 of the touch pad 130, the touch pad 130 stably rotates by the arrangement of the linkage element 170.

Referring to FIG. 3 and FIG. 5, in the present embodiment, the pivot portion 131 of the touch pad 130 includes a rotating shaft 131a, wherein the first casing 110 is provided with a clamping portion 113 for locating the rotating shaft 131a, and the rotating shaft 131a has a degree of freedom of motion for rotating relative to the clamping portion 113. For example, two rotating shafts 131a can be provided and are symmetrically disposed at two opposite sides of the pivot portion 131. Correspondingly, two clamping portions 113 can be provided and are symmetrically disposed at two opposite sides of the touch pad 130 (or the opening O). In other embodiments, the positions of the rotating shaft and the clamping portion arranged in pairs can be exchanged. For example, the first casing is provided with a rotating shaft, and the touch pad is provided with a clamping portion for pivoting the rotating shaft.

Figure 6:
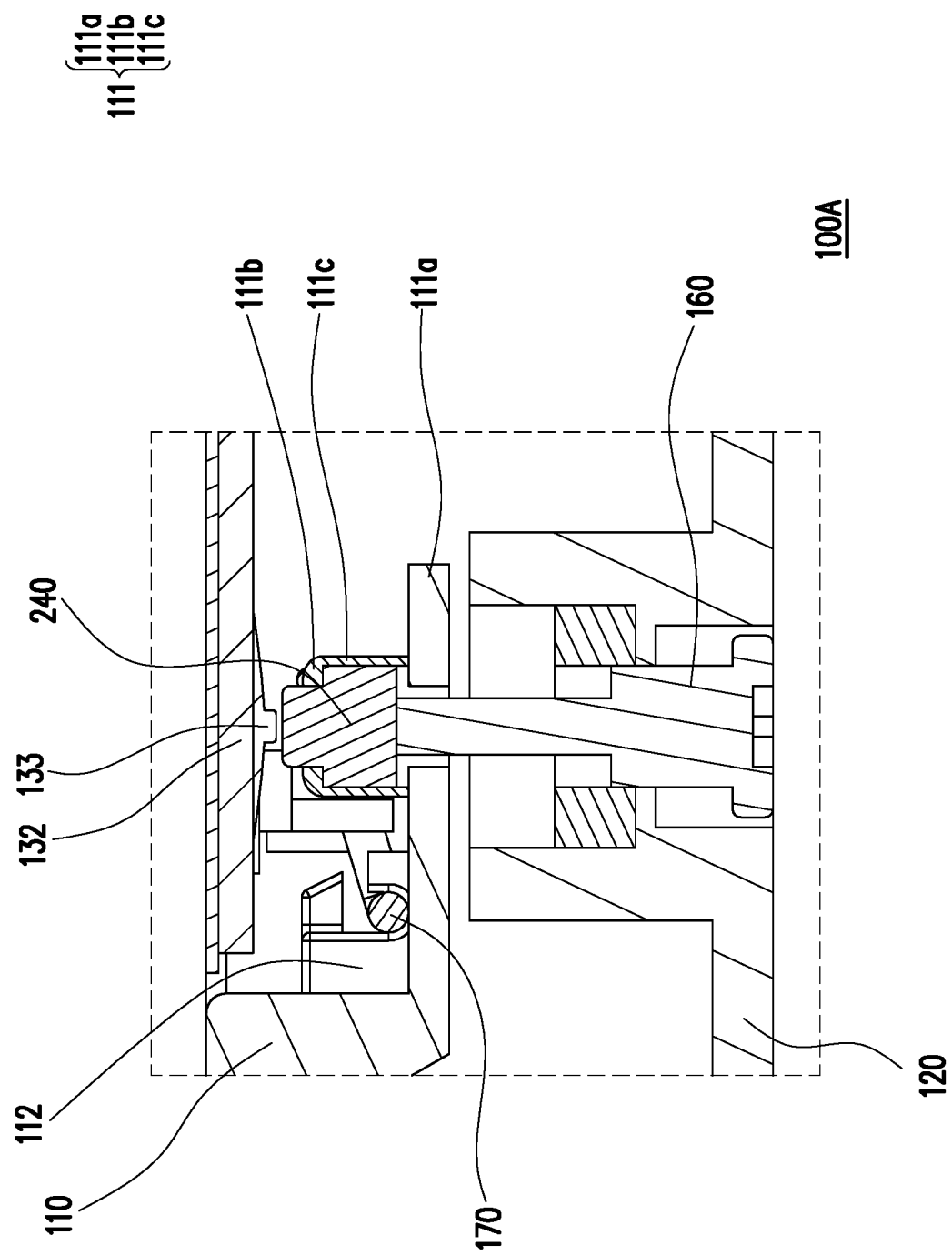
FIG. 6 is a partially enlarged schematic view of a touch pad structure according to another embodiment of the present disclosure.

FIG. 6 is a partially enlarged schematic view of a touch pad structure according to another embodiment of the present disclosure. Referring to FIG. 6, in the present embodiment, the design principle of the touch pad structure 100A is substantially similar to that of the touch pad structure 100 in the previous embodiment, and only the differences between the touch pad structure 100A and the touch pad structure 100 are described below.

In the present embodiment, the touch pad structure 100A is not provided with an elastic element 150 (shown in FIG. 2B) but adopts an elastic button 240. On the other hand, the adjusting element 160 directly abuts against the elastic button 240, and with the change of the depth of the adjusting element 160 locked (or moved) into the second casing 120, the elastic button 240 being compressed can generate different degrees of deformation, thereby setting the pre-compression amount of the elastic button 240. On the other hand, in order to ensure that the adjusting element 160 locked (or moved) into the second casing 120 can certainly compresses the elastic button 240, the adjusting element 160 is aligned to the elastic button 240.

For example, if the pre-compression amount of the elastic button 240 is greater, the elastic potential energy or counterforce accumulated by the elastic button 240 is greater. Therefore, when the user presses the movable portion 132 to enable the trigger 133 to be in contact with the elastic button 240, the user feels a relatively solid pressing hand feeling. On the contrary, if the pre-compression amount of the elastic button 240 is smaller, the elastic potential energy or counterforce accumulated by the elastic button 240 is smaller. Therefore, when the user presses the movable portion 132 to enable the trigger 133 to be in contact with the elastic button 240, the user feels a relatively soft pressing hand feeling. In other words, the user can adjust the pre-compression amount of the elastic button 240 according to individual operation habits so as to obtain a specific operation hand feeling when operating the touch pad structure 100A.

In summary of the foregoing, in a touch pad structure according to an embodiment of the present disclosure, the adjusting element can be used for adjusting the pre-compression amount of the elastic element. When the user presses the touch pad and enables the movable portion of the touch pad to be in contact with the button, the pre-compression amount of the elastic element can be fed back different pressing hand feelings to the user. In a touch pad structure according to another embodiment of the present disclosure, the adjusting element can be used for adjusting the pre-compression amount of the elastic button. when the user presses the touch pad and enables the movable portion of the touch pad to be in contact with the elastic button, the pre-compression amount of the elastic button can be fed back different pressing hand feelings to the user. In other words, the user can adjust the pre-compression amount of the elastic element or the elastic button according to individual operation habits so as to obtain a specific operation hand feeling when operating the touch pad structure. In addition, the touch pad structure is provided with a linkage element for improving the overall stability when the touch pad is pressed.

Although the present disclosure has been disclosed above by way of embodiments, it is not intended to limit the present disclosure. Any person having ordinary knowledge in the art can make some changes and refinements without departing from the spirit and scope of the present disclosure. Therefore, the protection scope of the present disclosure is defined by the scope of the appended claims.

What is claimed is:

1. A touch pad structure, comprising:
a first casing, having an opening;
a second casing, the first casing being disposed on the second casing;
a touch pad, disposed in the opening, wherein the touch pad has a pivot portion and a movable portion opposite to each other, the pivot portion is pivoted to the first casing, and a side of the movable portion facing the second casing is provided with a trigger;
an elastic element, located between the first casing and the second casing, wherein the elastic element is provided with a first end and a second end opposite to each other;
a button, aligned to the trigger and abutting against the first end of the elastic element; and
an adjusting element, rotatably and movably penetrating through the second casing and being aligned to the button, wherein the adjusting element abuts against the second end of the elastic element, and the adjusting element is an adjusting screw.

2. The touch pad structure according to claim 1, further comprising a linkage element, wherein the first casing further comprises a bracket located in the opening, the linkage element and the bracket are located between the touch pad and the second casing, the linkage element comprises a rod portion and two abutting portions connected to the rod portion, the rod portion of the linkage element is pivoted to the bracket, and the movable portion abuts against the two abutting portions.

3. The touch pad structure according to claim 2, wherein the two abutting portions are located at two opposite sides of the trigger.

4. The touch pad structure according to claim 2, wherein a side of the movable portion of the touch pad facing the second casing is provided with two hooks, and the two abutting portions movably penetrate through the two hooks respectively.

5. The touch pad structure according to claim 4, wherein the two hooks are located at two opposite sides of the trigger.

6. The touch pad structure according to claim 1, wherein the first casing comprises a carrying portion located in the opening, the trigger is aligned to the carrying portion, the button is disposed in the carrying portion, the button comprises a protrusion penetrating through the carrying portion, and the protrusion is aligned to the trigger.

7. The touch pad structure according to claim 6, wherein the carrying portion comprises a bottom plate, a stop portion and a side wall located between the bottom plate and the stop portion, the side wall connects the bottom plate and the stop portion, the side wall surrounds the button, the protrusion of the button penetrates through the stop portion, and the first end of the elastic element penetrates through the bottom plate.

8. The touch pad structure according to claim 7, wherein the bottom plate has a through hole for the first end of the elastic element to penetrate through, and an inner diameter of the through hole is smaller than an outer diameter of the button.

9. The touch pad structure according to claim 7, wherein the button has a top surface and a bottom surface opposite to each other, the protrusion protrudes from the top surface, the top surface abuts against the stop portion, a gap is maintained between the bottom surface and the bottom plate, and the first end of the elastic element abuts against the bottom surface.

10. The touch pad structure according to claim 1, wherein the adjusting element comprises a locking portion and a pillar portion connected to the locking portion, the second end of the elastic element is sleeved on the pillar portion and abuts against the locking portion, the second casing has a lock hole, and the locking portion is screwed to the lock hole.

11. A touch pad structure, comprising:
a first casing, having an opening and a carrying portion located in the opening;
a second casing, the first casing being disposed on the second casing;
a touch pad, disposed in the opening, wherein the touch pad has a pivot portion and a movable portion opposite to each other, the pivot portion is pivoted to the first casing, and a side of the movable portion facing the second casing is provided with a trigger;
an elastic button, disposed at the carrying portion and being aligned to the trigger; and
an adjusting element, rotatably and movably penetrating through the second casing, wherein the adjusting element is aligned to the elastic button and abuts against the elastic button, and the adjusting element is an adjusting screw.

* * * * *